Oct. 11, 1949. G. H. LINDEMANN 2,484,176
BODY CONSTRUCTION AND DOOR SEAL
Filed June 9, 1948 2 Sheets-Sheet 1
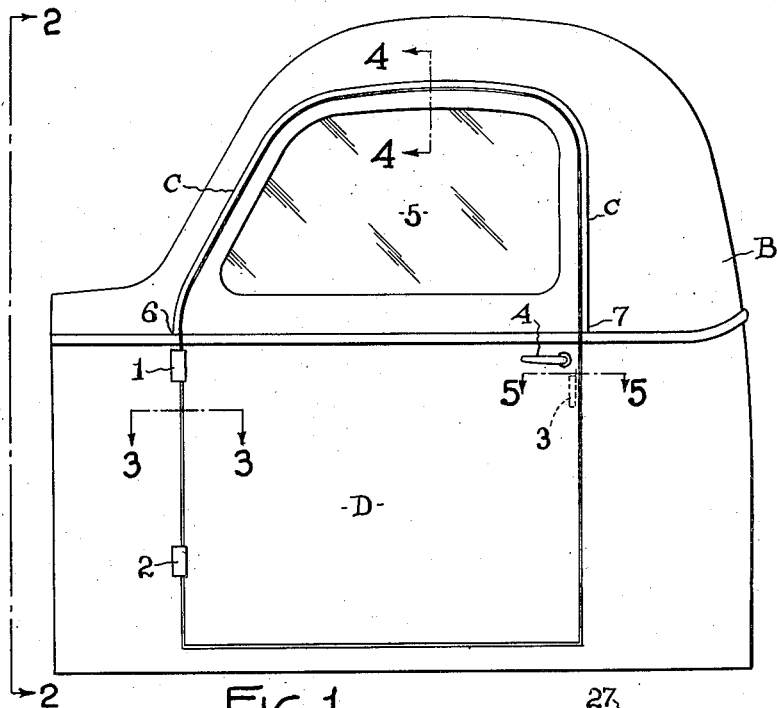
FIG. 1
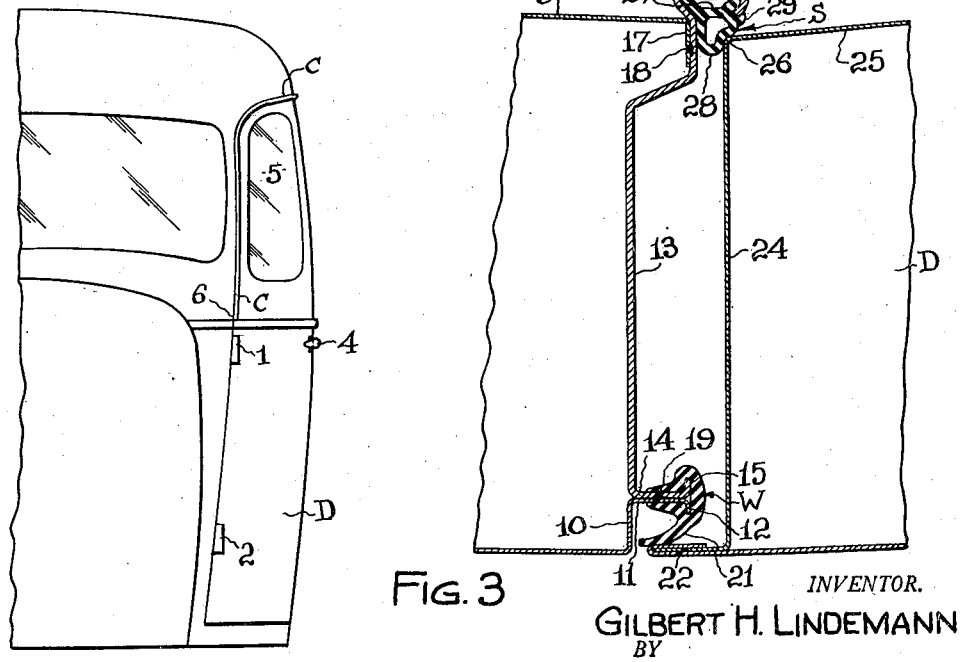
FIG. 2
FIG. 3
INVENTOR.
GILBERT H. LINDEMANN
BY
Bosworth & Sessions
ATTORNEYS.

Oct. 11, 1949.  G. H. LINDEMANN  2,484,176
BODY CONSTRUCTION AND DOOR SEAL
Filed June 9, 1948  2 Sheets-Sheet 2

INVENTOR.
GILBERT H. LINDEMANN
BY
Bosworth & Sessions
ATTORNEYS.

Patented Oct. 11, 1949

2,484,176

UNITED STATES PATENT OFFICE 2,484,176

BODY CONSTRUCTION AND DOOR SEAL

Gilbert H. Lindemann, Muncie, Ind.

Application June 9, 1948, Serial No. 32,000

13 Claims. (Cl. 296—44)

This invention relates to built-up or composite structures of the type exemplified by vehicle bodies, refrigerator boxes, etc., which have one or more door openings formed therein, and more particularly to improvements in the door frame and weather sealing portions of such structures.

Various arrangements have been proposed for forming door openings in vehicle bodies or the like and for providing seal means associated with the door and door opening to insure a tight joint when the door is closed. It is among the objects of my present invention to provide an improved door frame and door sealing means for structures of the type described which may be economically fabricated and assembled, which occupies a minimum of space, which is neat and attractive in appearance, and which enables a most effective seal to be obtained between the door and door frame.

Other objects of my invention include: the provision of improved resilient sealing strips and means for supporting same at the door openings of vehicle bodies, refrigerators and the like; the provision of an improved vehicle body construction wherein the door frame, drip molding or channel, and weather seal support assembly comprises a minimum of separate parts or elements which may readily be assembled by standard spot welding procedures; and the provision of a door frame and sealing assembly for structures of the type described in which exposed raw metal edges are avoided.

The above and other objects of my invention will appear from the following description of one embodiment thereof, reference being had to the accompanying drawings in which:

Figure 1 is an illustrative side elevation of a motor truck cab having a door opening, door, and door sealing means in accordance with my invention.

Figure 2 is a fragmentary front elevational view taken substantially on line 2—2 of Figure 1.

Figure 3 is an enlarged horizontal cross-sectional view taken substantially on line 3—3 of Figure 1.

Although I have chosen to illustrate my invention in the accompanying drawings as incorporated in a motor truck cab it will be understood by those skilled in the art that my improved door frame and sealing features may readily be incorporated in various different types of vehicle bodies, refrigerator boxes, or other structures.

Referring to Figure 1, a motor truck cab is generally indicated at B and includes a door D supported at its forward edge by suitable hinges 1 and 2. At the rear or free edge of door D is a latch mechanism 3, of any suitable type, adapted to be operated from outside of the vehicle by the handle 4. To prevent water from dripping off the cab roof at the door opening a drip channel C, which will be more fully described later, extends over the window opening 5 in the door D from a point indicated at 6 on the forward edge of the door opening to a point indicated at 7 on the rear edge of the door opening.

It is usual practice in the manufacture of automobile bodies, refrigerators, etc., to build up the structure from various stamped and rolled elements including a sheet metal outer body panel member and an inwardly spaced inner body panel member. In the illustrated truck cab the outer panel is indicated at 8 and the inner panel at 9. The outer body panel is normally substantially continuous in extent except for such necessary breaks as are required to provide door or window openings but the inner body panel frequently does not extend over the entire inner surface of the structure. Accordingly it will be understood that where the term "inner body panel" is employed herein it is intended to include any member which defines a portion of the inner wall of the structure and particularly the parts thereof which extend around and are adjacent to a door opening. In some cases the inner body panel member may be completely omitted and it will appear from the following description that the preesnt invention may be applied to structures which do not include an inner panel element.

Figure 5:
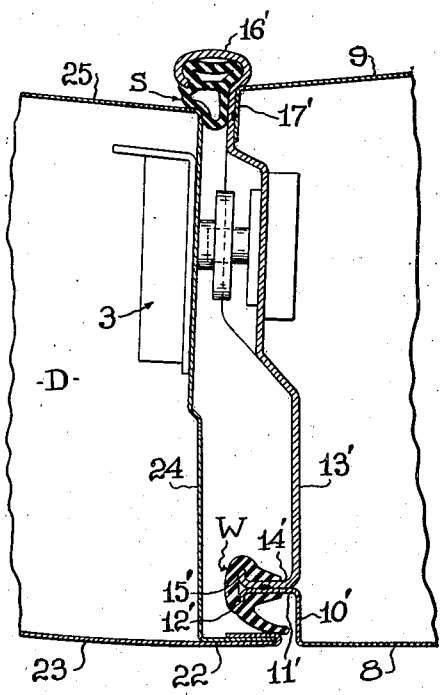
Figure 5 is an enlarged horizontal cross-sectional view, generally similar to Figure 3, but taken substantially on line 5—5 of Figure 1.

As is clearly seen in Figures 3 and 5, the outer body panel 8 has inwardly projecting offset portions 10 and 10' extending respectively from the point 6 down to the bottom of the door opening and from the point 7 down to the bottom of the door opening. At the inner edge of the offset portions 10 and 10' are webs 11 and 11' which extend toward the center of the door opening and at the free edge of these webs 11 and 11' are the relatively narrow outwardly extending weather seal retaining flanges 12 and 12'.

Extending transversely inwardly from the outer body panel 8 toward the inner body panel 9 along the sides of the door opening are the face members generally indicated at 13 and 13'. These face members are respectively formed with web portions 14 and 14' extending toward the center of the door opening and, in the assembled structure, web 14 is disposed in abutting engagement with the web 11 of the outer panel 8 and web 14' is disposed in abutting engagement with web 11' of outer panel 8. Inwardly projecting relatively narrow weather seal retaining flanges 15 and 15' are formed at the free edges of webs 14 and 14' and it will be seen from Figures 3 and 6 that the webs 11 and 14 with their flanges 12 and 15 form an outer weather seal retaining member of generally T-shaped cross section, the flanges 12 and 15 forming an enlarged head portion for purposes which will be later described. Figure 5 illustrates how a corresponding outer weather seal retaining member is formed at the rear of the door opening by webs 11' and 14'.

To support an inner weather sealing strip the inner edge of face member 13 is shaped to form a weather seal retaining channel 16 disposed adjacent the inner panel 9 and having a reduced opening facing outwardly. In like manner an inner seal retaining channel 16' is formed at the inner edge of face member 13'.

Inner body panel 9 is flanged outwardly at 17 and 17' and it will be seen from the above description that the face members 13 and 13' define the lower front and rear portions of the door opening in the cab B and form edge walls extending between the inner and outer body panels 8 and 9. Assembly of the body is facilitated by use of the elements described above as the face members 13 may readily be attached to the inner panel 9 as by a series of spot welds 18 spaced along the flanges 17 and 17'. It will be noted that, in the illustrated embodiment of my invention, the inner panel 9 is secured to the face members 13 and 13' adjacent to but outwardly spaced relative to the inner weather seal retaining channels 16 and 16' but it will be understood that this arrangement might be varied as, for example, by locating the channels 16 and 16' flush with the inner panel 9.

After the face members 13 and 13' are attached to the inner panel 9, the outer panel 8 is positioned with its webs 11 and 11' aligned with the webs 14 and 14'. These parts may readily be secured together as by spot welds indicated at 19 to complete the assembly. My improved construction eliminates the necessity for employing what is commonly known as "indirect" welding which is necessarily used when the parts are so formed that it is impossible to grip them directly between the electrodes of a spot welder. In indirect welding one of the elements must be connected to one side of the circuit and the welding electrode applied to the outer surface of the other element. It is frequently difficult to obtain satisfactory welds with this procedure when light gage materials are being handled and accordingly my improved door frame assembly, wherein the usual opposed pair of spot welding electrodes can be readily applied on opposite sides of the parts to be joined, possesses definite advantages from a manufacturing standpoint.

Figure 6:
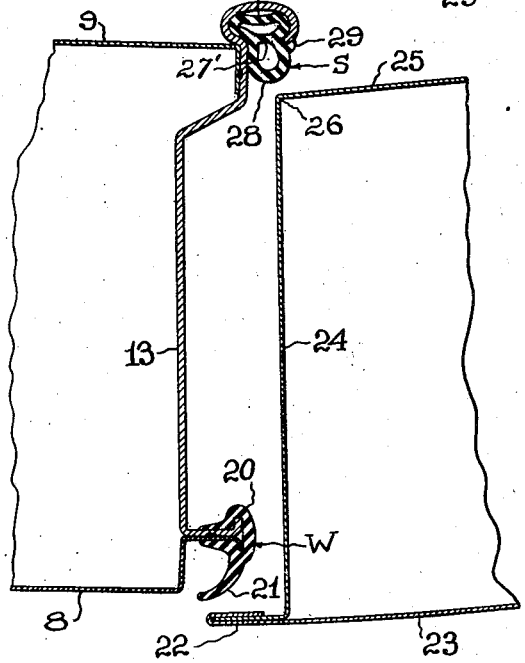
Figure 6 is an enlarged horizontal cross-sectional view, generally similar to Figure 3, but illustrating the door in partially opened position.

In addition to greatly facilitating assembly, the webs 11—11' and 14—14', together with their edge flanges 12—12' and 15—15', form supports for the outer resilient weather seal strip generally indicated at W. This strip is formed, as by molding or extruding, from rubber or other suitable flexible and resilient material. It includes (see Figure 6) a body portion 20, having a longitudinally extending T-shaped slot formed therein, and a sealing flap portion 21 which, when the strip W is in its normal or relaxed position as seen in Figure 6, projects outwardly and is curved away from the center of the door opening. Due to the resiliency of the material of which the strip W is made it may readily be installed on its T-shaped supporting member by opening the slot therein and progressively forcing the strip over the supporting web into the installed position seen in the drawings. This outer sealing strip W extends from the lower forward corner of the door opening upwardly over the top of the opening and down to the rear lower corner thereof and, when the door D is closed as seen in Figures 3, 4 and 5, the outer door flange 22 engages the sealing flap 21 bending it inwardly against the normal resiliency of the material and forming an effective outer weather seal.

Figure 7:
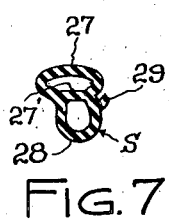
Figure 7 is a cross-sectional view of my inner sealing strip in its relaxed position, the strip being removed from the body structure.
Figure 8:
Figure 8 is a view similar to Figure 7 but illustrating a modified form of inner sealing strip.

The door D includes an outer panel portion 23, an edge face portion 24, and an inner panel portion 25 and, to provide a second weather seal at the inner edge corner 26 of door D, an inner resilient weather sealing strip S is provided. This sealing strip S is preferably formed of resilient rubber or the like and may advantageously be of hollow tubular form (see Figures 6 and 7) having a body portion 27 contoured to fit within the inner seal retaining channels 16 and 16', a reinforcing and stiffening inner web 27', door engaging portion 28, and a protective lip portion 29. The normal or relaxed cross-sectional form of the sealing strip S as extruded is seen in Figure 7. Figure 8 illustrates a modified form of inner sealing strip in which the reinforcing web 27' is omitted. It it pointed out that various interior web or rib reinforcements might be employed and that, in some cases, the strip be made of sponge rubber in non-tubular form. The inner weather seal strip S may readily be installed in the supporting channels 16 and 16' by progressively forcing the body portion 27 thereof into the reduced opening of the channels, it being understood that the normal resiliency of the material will cause it to expand and substantially fill the channel and be firmly retained therein. Lip 29 serves to cover and protect the otherwise exposed free edges of the channels 16 and 16'.

Figure 4:
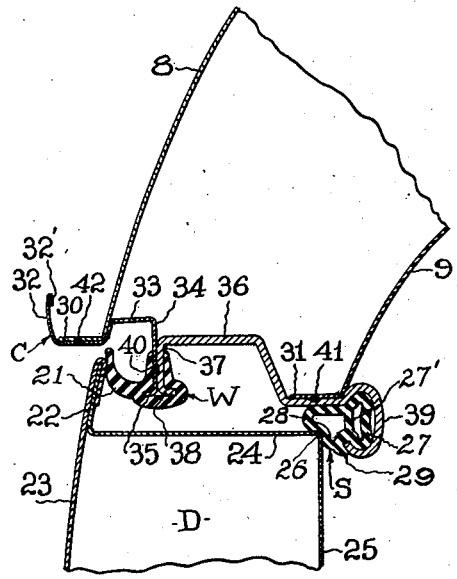
Figure 4 is an enlarged vertical cross-sectional view taken substantially on line 4—4 of Figure 1.

The normal or relaxed positions of the sealing strips W and S are seen in Figure 6 while Figures 3, 4, and 5 illustrate how the sealing strips are resiliently deformed when the door D is closed to provide effective sealing engagement around the entire door opening from the lower front corner thereof to the lower rear corner thereof. It will be understood that in the case of refrigerator doors or the like the sealing strips will preferably also be extended across the bottom of the door opening although in the usual vehicle body construction a different type of weather seal is employed at the bottom of the door from that employed along the sides and across the top.

Figure 4, which is a vertical cross-sectional view taken on line 44 of Figure 1, is typical of any cross section taken along the length of the drip channel C from point 6 (Figure 1) up over the door opening and down to point 7. As has been previously pointed out the flexible outer and inner weather seal strips W and S extend continuously around the door opening, except across the bottom thereof, but the upper portion of the door frame structure differs somewhat from the lower portion which has been previously described. As seen in Figure 4 the outer body panel 8 has an outwardly extending flange portion 30 and the inner body panel 9 also has an outwardly extending flange portion 31. The drip channel C extends from point 6 upwardly over the door opening and down to point 7 (Figure 1) and is of uniform cross section throughout its length. It includes an outer flange portion 32 extending away from the center of the door opening and preferably having its free edge bent inwardly as seen at 32' to form a finishing bead at its exposed edge. The center section 33 of drip channel C extends transversely between the outer and inner body panels 8 and 9 and the inner edge flange 34 of channel or molding C extends toward the center of the door opening and has a relatively narrow outwardly projecting flange 35 at its free edge.

The face member 36 (see Figure 4) may also be of uniform cross section throughout its length and extends from point 6 upwardly over the door opening and down to point 7. Integrally formed with face member 36 and projecting toward the center of the door opening is a flange or web 37 having an inwardly projecting relatively narrow sealing strip retaining lip or flange 38 at its free edge. An inner sealing strip retaining channel 39, similar in form and function to the previously described channels 16 and 16', is formed at the inner edge of face member 36.

In assembling the structure just described the abutting webs or flanges 34 and 37 of drip channel C and face member 36 may first be fastened together by suitable means such as spot welding indicated at 40. Next this sub-assembly is welded, as indicated at 41, to the flange 31 on the inner body panel 9. The last operation is to weld the flange 30 of outer body panel 8 to the center section 33 of the drip channel C as indicated at 42. All of these welds are readily accessible to the usual opposed electrode spot welding machine.

From the above description it will be seen that the flanges 34 and 37, together with their oppositely extending lip portions 35 and 38, form an outer weather seal retaining member which is aligned with and forms an extension of the outer weather seal retaining members illustrated in Figures 3, 5, and 6. In like manner the inner weather seal supporting channel 39 forms a continuation or extension of the previously described inner weather seal channels 16 and 16'.

My improved body construction thus provides an effective support for my resilient weather seal strips. In the truck cab illustrated, in order to provide a drip channel extending around the upper portion of the door opening, a somewhat different assembly of parts is employed on the upper portion of the door opening from that used on the front and rear lower edge portions of the door opening. It will be understood however that in applications of my invention to refrigerator boxes or the like, the face member could advantageously be of the same cross section around the entire door opening and thus might be economically formed by a rolling operation in the same manner as the drip channel C and the face member 36.

I have found that the outer weather sealing strip W, having a sealing flap 21 arranged as illustrated, is adapted to form an effective seal around the periphery of the door D. I have also determined that the tubular type inner weather seal S, supported in the manner illustrated, forms an effective inner weather seal around the door. These sealing strips will not jam or bind even at the hinged edge of the door and provide an effective seal at all points in spite of the different direction of approach of the outer door flange 22 and inner door corner portion 26 which occurs adjacent the hinge as compared to that at the free edge of the door.

It will be understood, of course, that modifications and variations may be made in the cross-sectional shape of the sealing strips W and S to accommodate different types of installations. It will also be understood that the form and proportions of the structural elements making up my improved structure may be varied without departing from the spirit of my invention. I do not therefore wish to be limited to the particular embodiment of my invention herein shown and described but claim as my invention all forms thereof coming within the scope of the appended claims.

I claim:

1. In a structure of the type described having a door opening, a door frame and sealing assembly including spaced inner and outer body panel members, a face member extending between said panel members to define a portion of said door opening, said face member having an inner weather seal retaining channel portion formed at its inner edge and a web at its outer edge projecting toward the center of said door opening, said outer body panel member being offset inwardly at said door opening and having a web extending parallel and adjacent to said web of said face member, means for securing said webs together to attach said face member to said outer body panel member and provide an outer weather seal support, and means for securing said inner body panel member to said face member adjacent said channel portion thereof.

2. In a structure of the type described having a door opening, a door frame and sealing structure comprising spaced inner and outer body panel members, a face member extending between said panel members to define a portion of said door opening, said face member having an inner weather seal retaining channel portion formed at its inner edge and a web at its outer edge projecting toward the center of said door opening, said outer body panel member being offset inwardly at said door opening and having a web extending parallel and adjacent to said web of said face member, means for securing said webs together to attach said face member to said outer body panel member and provide an outer weather seal support, means for securing said inner body panel member to said face member adjacent said channel portion thereof, a resilient outer weather seal strip overlying and supported by said outer weather seal support, and a resilient inner weather seal strip having a portion disposed in and supported by said channel portion of said face member.

3. In a structure of the type described having a door opening, an inner body panel member, an outer body panel member, a face member extending transversely between said inner and outer panel members and defining a portion of said door opening, said face member having a web portion at its outer edge, said web portion projecting toward the center of said door opening and having an inwardly extending weather seal retaining flange at its free edge, said outer body panel member being offset inwardly at said door opening and having a web portion disposed adjacent and secured to said web portion of said face member, said web portion of said outer body panel member having an outwardly extending weather seal retaining flange at its free edge, said web portions and said flanges forming an outer weather seal support extending along said door opening and spaced inwardly from said outer body panel member and said face member having an inner weather seal retaining channel formed at its inner edge, said inner body panel being secured to said face member adjacent said channel.

4. In a structure of the type described having a door opening, an inner body panel member, an outer body panel member, a face member extending transversely between said inner and outer panel members and defining a portion of said door opening, said face member having a web portion at its outer edge, said web portion projecting toward the center of said door opening and having an inwardly extending weather seal retaining flange at its free edge, said outer body panel member being offset inwardly at said door opening and having a web portion disposed adjacent and secured to said web portion of said face member, said web portion of said outer body panel member having an outwardly extending weather seal retaining flange at its free edge, said web portions and said flanges forming an outer weather seal support extending along said door opening and spaced inwardly from said outer body panel member, said face member having an inner weather seal retaining channel formed at its inner edge, said inner body panel member being secured to said face member adjacent said channel, a door hingedly supported on said structure for opening and closing movement relative to said door opening, an outer weather seal strip of flexible resilient material having a longitudinally extending slot of cross-sectional contour to fit over said outer weather seal support, said outer weather seal support being disposed in said slot, and an inner weather seal strip of flexible resilient material having a portion disposed within and retained by said inner weather seal retaining channel.

5. In a structure of the type described having a door opening, a door frame and sealing assembly comprising spaced inner and outer body panel members, a face member extending between said panel members to define a portion of said door opening, said face member having an inner weather seal retaining channel portion formed at its inner edge and a web at its outer edge projecting toward the center of said door opening, said outer body panel member being offset inwardly at said door opening and having a web extending parallel and adjacent to said web of said face member, means for securing said webs together to attach said face member to said outer body panel member and provide an outer weather seal support, and means for securing said inner body panel member to said face member adjacent to but outwardly spaced from said channel portion thereof.

6. In a structure of the type described having a door opening, a door frame and sealing structure comprising spaced inner and outer body panel members, a face member extending between said panel members to define a portion of said door opening, said face member having an inner weather seal retaining channel portion formed at its inner edge and a web at its outer edge projecting toward the center of said door opening, said outer body panel member being offset inwardly at said door opening and having a web extending parallel and adjacent to said web of said face member, means for securing said webs together to attach said face member to said outer body panel member and provide an outer weather seal support, means for securing said inner body panel member to said face member adjacent to but outwardly spaced from said channel portion thereof, a resilient outer weather seal strip overlying and supported by said outer weather seal support, and a resilient inner weather seal strip having a portion disposed in and supported by said channel portion of said face member.

7. In a structure of the type described having a door opening, an inner body panel member, an outer body panel member, a face member extending transversely between said inner and outer panel members and defining a portion of said door opening, said face member having a web portion at its outer edge, said web portion projecting toward the center of said door opening and having an inwardly extending weather seal retaining flange at its free edge, said outer panel member being offset inwardly at said door opening and having a web portion disposed adjacent and secured to said web portion of said face member, said web portion of said outer panel member having an outwardly extending weather seal retaining flange at its free edge, said web portions and said flanges forming an outer weather seal support extending along said door opening and spaced inwardly from said outer panel member, and said face member having an inner weather seal retaining channel formed at its inner edge, said inner panel member being secured to said face member adjacent to but outwardly spaced from said channel.

8. In a structure of the type described having a door opening, an inner body panel member, an outer body panel member, a face member extending transversely between said inner and outer body panel members and defining a portion of said door opening, said face member having a web portion at its outer edge, said web portion projecting toward the center of said door opening and having an inwardly extending weather seal retaining flange at its free edge, said outer body panel member being offset inwardly at said door opening and having a web portion disposed adjacent and secured to said web portion of said face member, said web portion of said outer body panel member having an outwardly extending weather seal retaining flange at its free edge, said web portions and said flanges forming an outer weather seal support extending along said door opening and spaced inwardly from said outer body panel member, said face member having an inner weather seal retaining channel formed at its inner edge, said inner body panel member being secured to said face member adjacent to but outwardly spaced from said channel, a door hingedly supported on said structure body for opening and closing movement relative to said door opening, an outer weather seal strip of flexible resilient material having a longitudinally extending slot of cross-sectional contour to fit over said outer weather seal support, said outer weather seal support being disposed in said slot, and an inner weather seal strip of flexible resilient material having a portion disposed within and retained by said inner weather seal retaining channel.

9. In a vehicle body having a door opening, an outer body panel member, a face member defining said door opening, said face member having a flange extending generally in the direction of the plane of said door opening, said outer body panel member having an outwardly extending flange at said door opening, a drip channel member having an outer edge flange extending away from the center of said door opening, a center section, and an inner edge flange extending toward the center of said door opening, means for securing said outer body panel flange to said center section of said drip channel member, and means for securing said inner edge flange of said drip channel member to said flange of said face member.

10. In a vehicle body having a door opening, inner and outer body panel members, a face member extending between said panel members and defining said door opening, said face member having a flange extending generally in the direction of the plane of said door opening, said outer body panel member having an outwardly extending flange at said door opening, a drip channel member having an outer edge flange extending away from the center of said door opening, a center section, and an inner edge flange extending toward the center of said door opening, means for securing said outer body panel flange to said center section of said drip channel member, means for securing said inner edge flange of said drip channel member to said flange of said face member, and means for securing said inner body panel to said face member.

11. In a vehicle body having a door opening, inner and outer body panel members, a face member extending between said panel members and defining a portion of said door opening, said face member having an outer weather seal supporting flange extending toward the center of said door opening from its outer edge and an inner weather seal supporting channel at its inner edge, said outer body panel member having an outwardly extending flange at said door opening, a drip channel member having an outer edge flange extending away from the center of said door opening, a center section, and an inner edge flange extending toward the center of said door opening, means for securing said outer body panel flange to said center section of said drip channel member, means for securing said inner edge flange of said drip channel member to said outer weather seal supporting flange of said face member, and means for securing said inner body panel to said face member adjacent said inner weather seal supporting channel.

12. In a vehicle body, inner and outer body panel members, a face member extending between said panel members and defining a door opening, said face member having an outer weather seal supporting flange extending toward the center of said door opening from its outer edge and an inner weather seal supporting channel at its inner edge, said outer body panel member having an outwardly extending flange at said door opening, a drip channel member having an outer edge flange extending away from the center of said door opening, a center section, and an inner flange extending toward the center of said door opening, means for securing said outer body panel flange to said center section of said drip channel member, means for securing said inner flange of said drip channel member to said outer weather seal supporting flange of said face member to form an outer weather seal support, means for securing said inner body panel to said face member adjacent said inner weather seal supporting channel, an outer resilient weather seal strip carried by said outer weather seal support, and an inner resilient weather seal strip carried by said weather seal supporting channel.

13. In a structure of the type described having a door opening, a door frame and sealing assembly including an outer body panel member, and a face member extending inwardly from said body panel member and defining a portion of said door opening, said face member having a web portion at its outer edge, said web portion projecting toward the center of said door opening and having an inwardly extending weather seal retaining flange at its free edge, said outer body panel member being offset inwardly at said door opening and having a web portion disposed adjacent and secured to said web portion of said face member, said web portion of said outer body panel member having an outwardly extending weather seal retaining flange at its free edge, said web portions and said flanges forming an outer weather seal support extending along said door opening and spaced inwardly from said outer body panel member.

GILBERT H. LINDEMANN.

REFERENCES CITED

The following references are of record in the file of this patent:

UNITED STATES PATENTS

| Number | Name | Date |
| --- | --- | --- |
| 2,205,797 | Ledwinka | June 25, 1940 |
| 2,247,457 | Widman | July 1, 1941 |
| 2,369,035 | Fergueson | Feb. 6, 1945 |
| 2,456,175 | Coppock et al. | Dec. 14, 1948 |

FOREIGN PATENTS

| Number | Country | Date |
| --- | --- | --- |
| 178,144 | Switzerland | Nov. 16, 1935 |
| 843,138 | France | Mar. 20, 1939 |